US 6,604,452 B2

(12) United States Patent
Hanson et al.

(10) Patent No.: US 6,604,452 B2
(45) Date of Patent: Aug. 12, 2003

(54) FOOD PROCESSOR WITH CIRCULATION SYSTEM AND METHOD

(75) Inventors: Robert E. Hanson, Madison, WI (US); Dennis F. Conohan, Cross Plains, WI (US); Brian G. Sandberg, Sun Prairie, WI (US); Peter G. Senn, Schopfheim (DE); Dennis P. Roelke, Prairie du Sac, WI (US); David L. Brethorst, Lodi, WI (US); Glenn L. Leach, Wisconsin Rapids, WI (US); Christopher D. McLinn, Lodi, WI (US); Seth T. Pulsfus, Poynette, WI (US); Thomas J. Betley, Lodi, WI (US)

(73) Assignee: Alkar-RapidPak, Inc., Lodi, WI (US)

( * ) Notice: Subject to any disclaimer, the term of this patent is extended or adjusted under 35 U.S.C. 154(b) by 0 days.

(21) Appl. No.: 09/851,292

(22) Filed: May 8, 2001

(65) Prior Publication Data

US 2002/0166457 A1 Nov. 14, 2002

(51) Int. Cl.[7] .................................................. A21B 1/26
(52) U.S. Cl. .................. 99/330; 99/443 C; 99/450; 99/475; 99/476; 99/477; 99/480; 62/266; 62/380; 62/408; 62/419; 62/441
(58) Field of Search ............... 99/330, 443 C, 99/450, 472–477, 480, 483; 62/265–266, 380, 414, 408, 419, 441

(56) References Cited

U.S. PATENT DOCUMENTS

| 1,374,709 | A | * | 4/1921 | Allsop et al. | |
| 2,136,124 | A | * | 11/1938 | Berger | 34/19 |
| 2,783,545 | A | | 3/1957 | Booth | 34/20 |
| 2,870,024 | A | | 1/1959 | Martin | 99/182 |
| 4,155,293 | A | | 5/1979 | Spiel et al. | 99/352 |
| 4,583,454 | A | | 4/1986 | Huang et al. | 99/468 |
| 4,590,916 | A | | 5/1986 | Konig | 126/21 A |
| 4,676,152 | A | * | 6/1987 | Tsuji et al. | 99/468 |
| 5,253,569 | A | | 10/1993 | McFarlane et al. | 99/476 |
| 5,425,959 | A | * | 6/1995 | Manser | 426/231 |
| 5,671,660 | A | * | 9/1997 | Moshonas | 99/443 C |
| 6,320,165 | B1 | * | 11/2001 | Ovadia | 219/400 |
| 6,354,196 | B1 | * | 3/2002 | Malmberg et al. | 99/443 C |

FOREIGN PATENT DOCUMENTS

| EP | 0803218 | 10/1997 |
| GB | 134100 | 10/1919 |
| GB | 762677 | 12/1956 |
| GB | 910177 | 11/1962 |

* cited by examiner

Primary Examiner—Keith Hendricks
Assistant Examiner—Drew Becker
(74) Attorney, Agent, or Firm—Andrus, Sceales, Starke & Sawall, LLP

(57) ABSTRACT

A food processing system circulates a processing medium along a circulation path having first and second segments perpendicular to food product travel along a horizontal conveyor. In another aspect, desired sequencing is provided including reversal of orientation order of return and supply path segments of the circulating processing medium.

3 Claims, 3 Drawing Sheets

FOOD PROCESSOR WITH CIRCULATION SYSTEM AND METHOD

BACKGROUND AND SUMMARY

The invention relates to a food processing apparatus and method, including cooking and/or chilling, and more particularly to circulation systems and methods.

In one aspect, a food processing apparatus and method is provided including a circulation system circulating a processing medium along a circulation path having first and second vertical supply and return path segments flowing processing medium vertically across a food product traveling horizontally through a food processing chamber on a horizontal conveyor.

In another aspect, a food processing apparatus and method is provided for transporting the food product serially sequentially through a plurality of modular compartments each having its own circulation system circulating a processing medium along a circulation path having supply and return path segments. Desired serial sequencing is provided.

DETAILED DESCRIPTION

Figure 1:
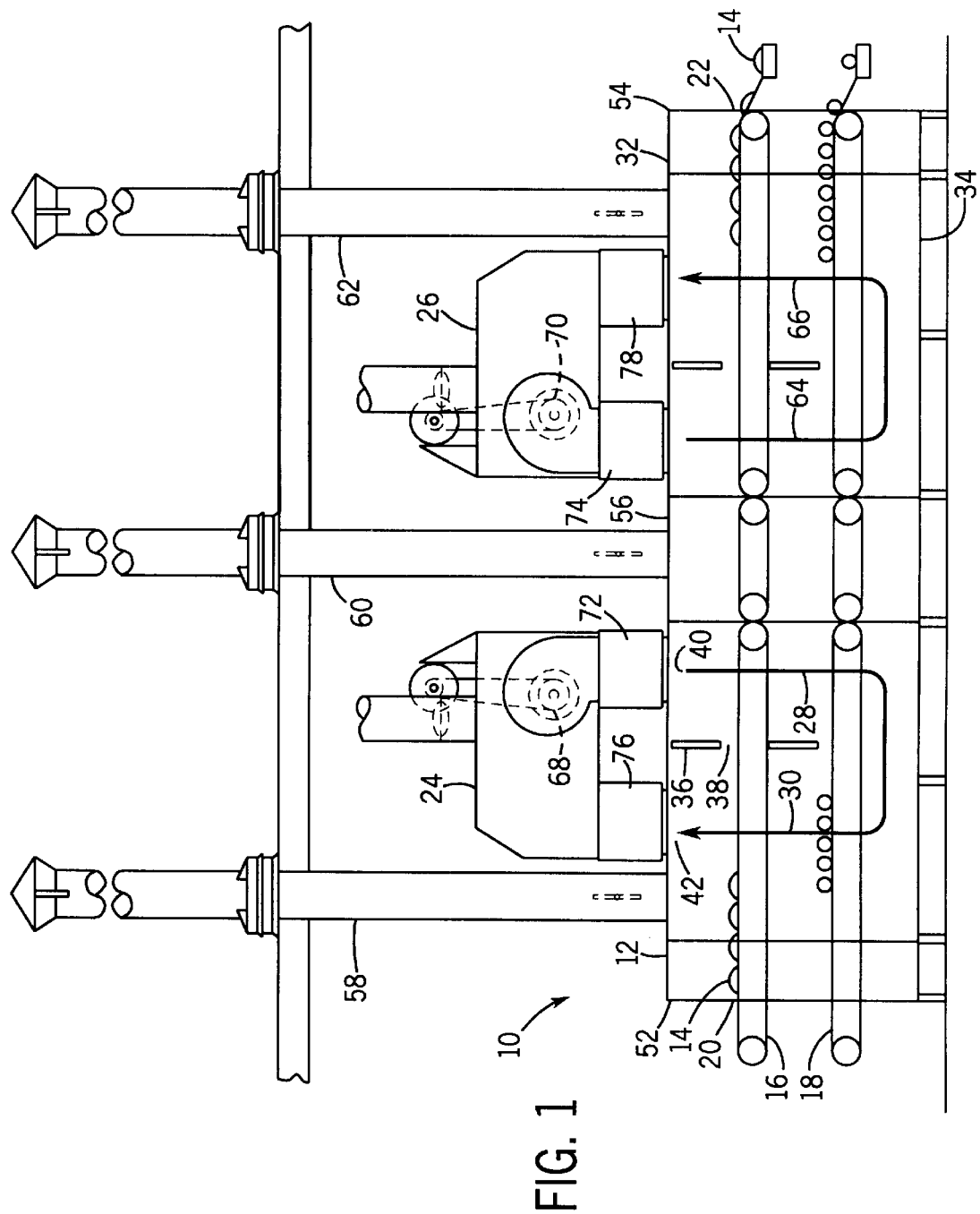
FIG. 1 is a schematic illustration of food processing apparatus in accordance with the invention.

FIG. 1 shows food processing apparatus 10 including a food processing chamber 12 for processing a food product 14, such as meat products, e.g. hot dogs, poultry, fish, or other food products. One or more horizontal conveyors 16, 18 transport the food product horizontally forwardly through chamber 12 from entrance 20 to exit 22. One or more circulation systems 24, 26 circulate a processing medium, for example heated air or smoke or chilled air or brine solution or mist, or the like, for which further reference may be had to U.S. Pat. Nos. 4,583,454 and 5,253,569, incorporated herein by reference. The processing medium is circulated along a circulation path having first and second vertical segments 28 and 30, segment 28 being a supply path segment, and segment 30 being a return path segment, such that the processing medium flows vertically across food product 14 traveling horizontally through chamber 12. The processing medium flows in a first downward vertical direction in first segment 28 and in a second upward vertical direction in second segment 30, which directions are opposite to each other. Horizontal conveyor belts 16, 18 are of an open mesh type to enable vertical air flow therethrough. Chamber 12 has upper and lower walls 32 and 34 respectively spaced above and below the one or more horizontal conveyors 16, 18. The circulation path provided by segments 28, 30 begins and ends at one of such walls, preferably upper wall 32.

Segments 28 and 30 are horizontally spaced from each other along a direction parallel to the direction of horizontal travel of food product through chamber 12. A barrier wall 36 extends generally vertically in chamber 12 and has an opening 38 through which the conveyor extends horizontally. Supply path segment 28 is forward of barrier wall 36, and return path segment 30 is rearward of barrier wall 36.

Figure 2:
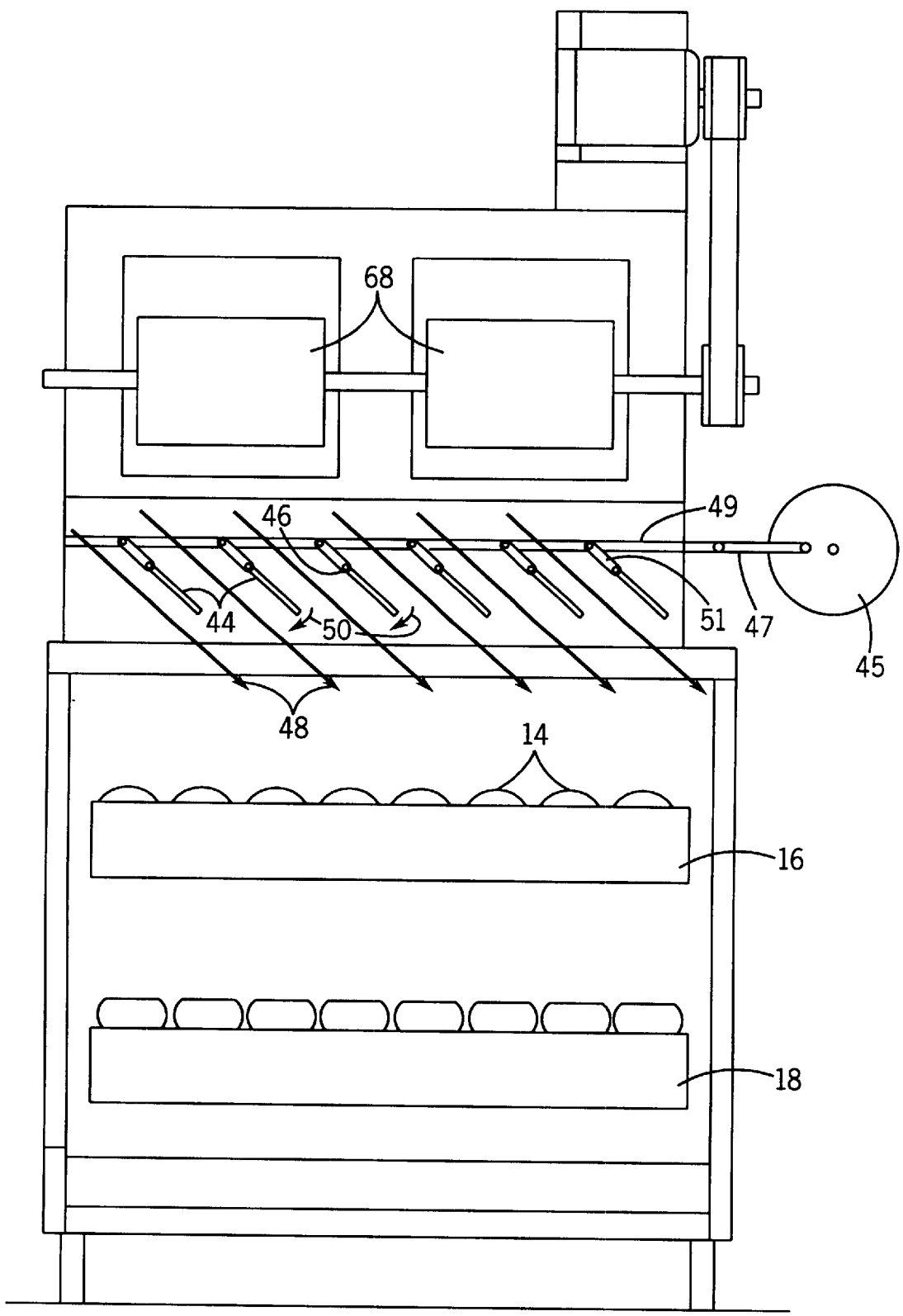
FIG. 2 is a schematic sectional view of a portion of FIG. 1.

Supply path segment 28 has an entrance 40, and return path segment 30 has an exit 42. Supply path entrance 40 and return path exit 42 are horizontally spaced by barrier wall 36 therebetween. Supply path entrance 40 has a plurality of wig-wag dampers 44, FIG. 2 oscillating about pivot axes 46 which extend along directions parallel to the direction of horizontal travel of food product 14 through chamber 12. The processing medium enters supply path segment 28 between dampers 44 along channeled flow paths 48 oscillated back and forth as shown at arrows 50 across food product 14. Flow paths 48 have changing directions during oscillation, some of which directions are oblique relative to both horizontal and vertical. The dampers may be oscillated in any known manner, for example by a motor driven cam 45 connected by a link arm 47 driving link bar 49 in turn driving respective links 51 connected to respective dampers 44 at their respective pivot axes, or any other oscillating mechanism.

Chamber 12 in FIG. 1 includes a plurality of modular compartments such as 52, 54 in series relation, and which may include an intermediate compartment such as 56 therebetween such as a liquid drench compartment, for example if compartment 52 is a heating zone and compartment 54 is a drying zone. Each compartment may be provided with its own exhaust stack such as 58, 60, 62. Food product 14 is transported sequentially serially through the compartments. Each compartment has its own circulation system 24, 26 circulating a processing medium along a circulation path having first and second segments, 28, 30, and 64, 66, respectively. One of the segments is a supply path segment S, and the other segment is a return path segment R. Compartments 52 and 54 are reversed in R and S sequence relative to each other such that food product 14 is transported sequentially forwardly through the two compartments in the following serial sequence R→S→S→R, namely serially sequentially through return path segment 30 then through supply path segment 28 then through supply path segment 64 then through return path segment 66.

Each compartment 52, 54 has a blower 68, 70, respectively, each having an output 72, 74, respectively, supplying processing medium to the respective supply path segment S 28, 64, respectively, at positive pressure, and an input 76, 78 respectively, returning processing medium from the respective return path segment R 30, 66, at negative pressure. Chamber 12 has the noted upstream entrance 20 and the noted downstream exit 22. The upstream-most compartment 52 is oriented with its R segment 30 serially upstream of its S segment 28. The downstream-most compartment 54 is oriented with its R segment 66 serially downstream of its S segment 64.

Figure 3:
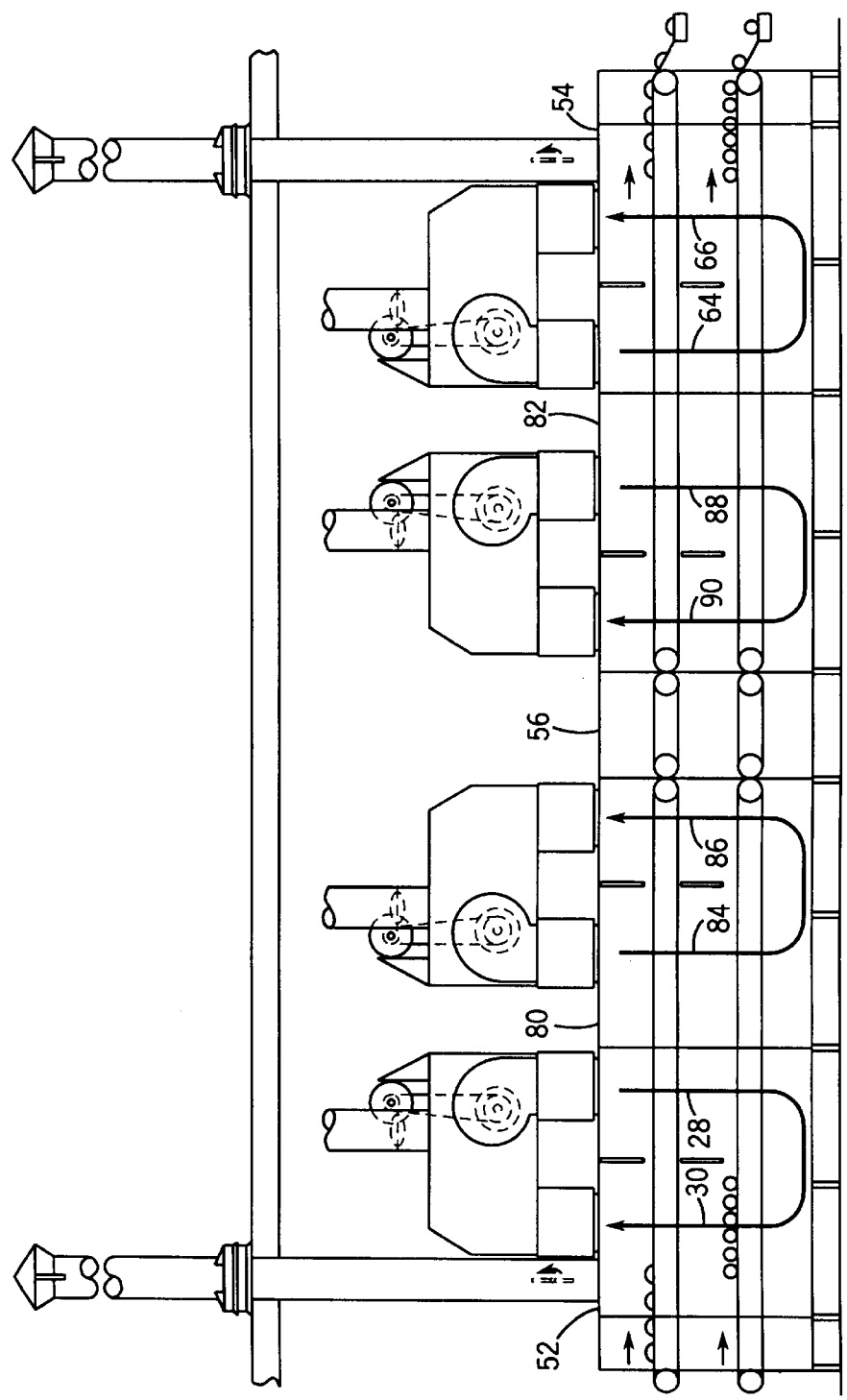
FIG. 3 is like FIG. 1 and shows a further embodiment.

FIG. 3 shows a further embodiment including four compartments 52, 80, 82, 54 in the following serial sequence R→S→S→R→R→S→S→R, namely return path segment 30→supply path segment 28→supply path segment 84→return path segment 86→return path segment 90→supply path segment 88→supply path segment 64→return path segment 66. The noted return path segments at the entrances and exits to the food processing chamber are desired to prevent escape of processing medium from the chamber, i.e. the negative pressure of the return path segment will tend to maintain the processing medium within the chamber.

It is recognized that various equivalents, alternatives and modifications are possible within the scope of the appended claims.

What is claimed is:

1. Food processing apparatus comprising a food processing chamber for processing a food product, a horizontal conveyor for transporting said food product horizontally through said chamber, a circulation system circulating a processing medium along a circulation path having first and second vertical segments, one of said segments being a supply path segment, the other of said segments being a return path segment, such that said processing medium flows vertically across said food product traveling horizontally through said chamber, wherein said first and second segments are horizontally spaced from each other along a direction parallel to the direction of horizontal travel of said food product through said chamber, said food travels horizontally forwardly through said chamber, and comprising a barrier wall extending generally vertically in said chamber and having an opening through which said conveyor extends horizontally, said first segment being forward of said barrier wall, said second segment being rearward of said barrier wall, said supply path segment has an entrance, and said return path segment has an exit, said supply path entrance and said return path exit being horizontally spaced by said barrier wall therebetween, said supply path entrance having a plurality of wig-wag dampers oscillating about pivot axes which extend along directions parallel to said direction of horizontal travel of said food product through said chamber, such that said processing medium enters said supply path portion between said dampers along channeled flow paths oscillated back and forth across said food product, said flow paths having changing directions during oscillation, some of said directions being oblique relative to both horizontal and vertical.

2. Food processing apparatus comprising a food processing chamber for processing a food product, said chamber having a plurality of modular compartments in series relation, a conveyor for transporting said food product forwardly through said chamber by transporting said food product sequentially serially through said compartments, each of said compartments having its own circulation system circulating a processing medium along a circulation path having first and second segments, one of said segments being a supply path segment S, the other of said segments being a return path segment R, wherein at least two of said compartments are reversed in R and S sequence relative to each other such that said food product is transported sequentially forwardly through said two compartments in the following serial sequence R→S→S→R→, wherein each said compartment has a blower having an output supplying said processing medium to the respective said supply path segment S at positive pressure, and an input returning said processing medium from the respective said return path segment R at negative pressure, and wherein said chamber has upstream entrance and a downstream exit, and wherein the upstream-most of said compartments is oriented with its R segment serially upstream of its S segment, and wherein the downstream-most of said compartments is oriented with its R segment serially downstream of its S segment, such that said R segment of said upstream-most of said compartments is at said entrance, and said R segment of said downstream-most of said compartments is at said exit, whereby to prevent escape of said processing medium from said chamber, namely by using said negative pressure of said R segments to maintain said processing medium within said chamber at said entrance and said exit.

3. The invention according to claim 2 comprising four said compartments in the following serial sequence R→S→S→R→R→S→S→R.

* * * * *